United States Patent
Lee

(10) Patent No.: US 9,377,789 B2
(45) Date of Patent: Jun. 28, 2016

(54) THERMOSTAT

(71) Applicants: Hyundai Motor Company, Seoul (KR); Kia Motors Corporation, Seoul (KR)

(72) Inventor: Philgi Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 683 days.

(21) Appl. No.: 13/711,299

(22) Filed: Dec. 11, 2012

(65) Prior Publication Data

US 2014/0097258 A1 Apr. 10, 2014

(30) Foreign Application Priority Data

Oct. 8, 2012 (KR) .......................... 10-2012-0111409

(51) Int. Cl.
*G05D 23/01* (2006.01)
*G05D 23/02* (2006.01)
*G05D 23/185* (2006.01)
*G05D 23/13* (2006.01)

(52) U.S. Cl.
CPC ........ *G05D 23/1852* (2013.01); *G05D 23/1333* (2013.01)

(58) Field of Classification Search
CPC .......................... G05D 23/1852; G05D 23/022
USPC ................. 236/99 K, 99 J, 101 R, 102, 34.5
See application file for complete search history.

(56) References Cited

U.S. PATENT DOCUMENTS

| | | | | |
|---|---|---|---|---|
| 3,554,440 A * | 1/1971 | Austin | ................. | G05D 23/134 236/34.5 |
| 4,260,011 A * | 4/1981 | Brown | ................... | F01P 3/202 123/41.09 |
| 5,381,953 A * | 1/1995 | Fishman | ................. | F01P 11/16 236/34.5 |
| 2007/0176009 A1* | 8/2007 | Gebauer | ............. | G05D 23/022 236/101 R |
| 2007/0194136 A1* | 8/2007 | Cunningham | ........ | F16K 31/002 236/12.11 |
| 2008/0061155 A1* | 3/2008 | Seymour | ............. | G05D 23/022 236/12.11 |
| 2009/0205589 A1* | 8/2009 | Auweder | ............ | G05D 23/022 123/41.09 |
| 2010/0012738 A1* | 1/2010 | Park | .......................... | F01P 7/16 236/101 C |
| 2010/0132361 A1* | 6/2010 | Bouloy | ............... | G05D 23/022 60/664 |
| 2010/0186831 A1* | 7/2010 | Roman | ............... | G05D 23/022 137/468 |
| 2010/0230504 A1* | 9/2010 | Pottie | .................. | G05D 23/022 236/93 R |
| 2012/0097750 A1* | 4/2012 | Kusakabe | ........... | G05D 23/022 236/93 R |

* cited by examiner

*Primary Examiner* — Henry Crenshaw
(74) *Attorney, Agent, or Firm* — Morgan, Lewis & Bockius LLP

(57) ABSTRACT

A thermostat apparatus may include a thermostat case where a first passage may be formed, a first valve that may be disposed in the thermostat case to open or close the first passage, wherein a mounting protrusion may be formed along an inner circumference of the first valve, a drive portion that may be disposed to penetrate the first valve and moves the first valve depending on temperature to open or close the first passage, and a rubber cap that a first side interior circumference thereof contacts an exterior circumference of the mounting protrusion of the first valve and a second side interior circumference thereof slidably contacts an exterior circumference of the drive portion.

8 Claims, 6 Drawing Sheets

Petail A

THERMOSTAT

CROSS-REFERENCE TO RELATED APPLICATION

The present application claims priority to Korean Patent Application No. 10-2012-0111409 filed on Oct. 8, 2012, the entire contents of which is incorporated herein for all purposes by this reference.

BACKGROUND OF THE INVENTION

1. Field of the Invention

The present invention relates to a thermostat that changes a passage of a coolant depending on the temperature of the coolant and actively controls the coolant temperature to prevent the overheating thereof.

2. Description of Related Art

A thermostat for a vehicle is disposed between an engine and a radiator and is opened/closed by the temperature variation of coolant to adjust the flow rate of the coolant, and therefore the temperature of the coolant is controlled in a predetermined range.

A mechanical thermostat expands wax depending on the temperature of the coolant, and the expanding force of the wax makes a piston move the valve of the thermostat.

The mechanical thermostat is operated in a predetermined opening/closing temperature of the coolant to open/close the valve only in a predetermined temperature condition, and therefore the mechanical thermostat does not actively move against changes of the driving circumstances of the vehicle.

Accordingly, an electrical thermostat has been introduced to complements the drawback of the mechanical thermostat, and the electrical thermostat is operated to sustain the coolant temperature in an optimized range.

The electrical thermostat actively controls the coolant temperature of the engine according to the driving circumstances such as the load level of the vehicle to sustain the optimized coolant temperature, and the electrical thermostat can improve fuel consumption efficiency and reduce exhaust gas.

Meanwhile, three coolant passages are formed in a thermostat as an example. A first passage is connected to a radiator, a second passage is connected to a coolant outlet of the engine, and a third passage is connected to a coolant inlet of the engine. Here, the coolant pump can be disposed between the third passage and the coolant inlet.

In this case, the first valve of the thermostat opens/closes the first passage, the second valve opens/closes the second passage, and the third passage is opened. Further, a guide can be disposed to guide the movement of the first and second valve.

Meanwhile, a first valve is operated by a drive portion to open/close the first passage, a sealing member is disposed between the first valve and the drive portion to form the sealing structure between them, but the sealing member cannot perform its function by anti-freezing solution of coolant or foreign material.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a thermostat having advantages of preventing the anti-freezing solution from being permeated into a gap of a valve and a wax case to improve sealing structure and simultaneously durability.

In an aspect of the present invention, a thermostat apparatus may include a thermostat case where a first passage is formed, a first valve that is disposed in the thermostat case to open or close the first passage, wherein a mounting protrusion is formed along an inner circumference of the first valve, a drive portion that is disposed to penetrate the first valve and moves the first valve depending on temperature to open or close the first passage, and a rubber cap that a first side interior circumference thereof contacts an exterior circumference of the mounting protrusion of the first valve and a second side interior circumference thereof slidably contacts an exterior circumference of the drive portion.

The first side interior circumference of the rubber cap is fixed on the exterior circumference of the mounting protrusion and the second side interior circumference of the rubber cap slidably contacts the exterior circumference of the drive portion.

The drive portion may include a mounting pipe fixed on a central portion of the first passage.

A cap groove is formed on the exterior circumference of the mounting protrusion and a hook protrusion that is formed on the first side interior circumference of the rubber cap is inserted into the cap groove, and a contact surface is formed on the second side interior circumference of the rubber cap to slide on the exterior circumference of the drive portion.

The first side interior circumference of the rubber cap slidably contacts the exterior circumference of the mounting protrusion, and the second side interior circumference of the rubber cap is fixed on the exterior circumference of the drive portion.

A cap groove is formed on the exterior circumference of the drive portion, wherein a hook protrusion that is formed on an interior circumference of the rubber cap is inserted into the cap groove, and wherein a contact surface is formed on the first side interior circumference of the rubber cap to slide with the exterior circumference of the mounting protrusion.

The drive portion may include a wax case in which wax is charged to be contracted or expanded depending on the temperature.

A sealing member is interposed between the first valve and the drive portion.

The drive portion may include a wax case in which wax is charged to be contracted or expanded depending on the temperature.

The drive portion may include a mounting pipe that is fixed on a central portion of the first passage, a wax case that is fixed on one end of the mounting pipe and in which wax is charged to be contracted or expanded depending on the temperature, and a piston that moves a valve body that is integrally formed with the first valve by contraction or expansion of the wax to operate the first valve, wherein the rubber cap slides with an exterior circumference of the mounting pipe or the wax case depending on an operating position of the first valve.

The first valve is formed at a first side of the valve body, the second valve is formed at a second side thereof to open or close the second passage that is formed at the thermostat case, wherein when the first valve closes the first passage, the second valve opens the second passage, and when the first valve opens the first passage, the second valve reduces an opening rate of the second passage or closes the second passage.

A thermostat according to an exemplary embodiment of the present invention prevents the anti-freezing solution from being permeated into a gap of a valve and a wax case and improves sealing structure and simultaneously durability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
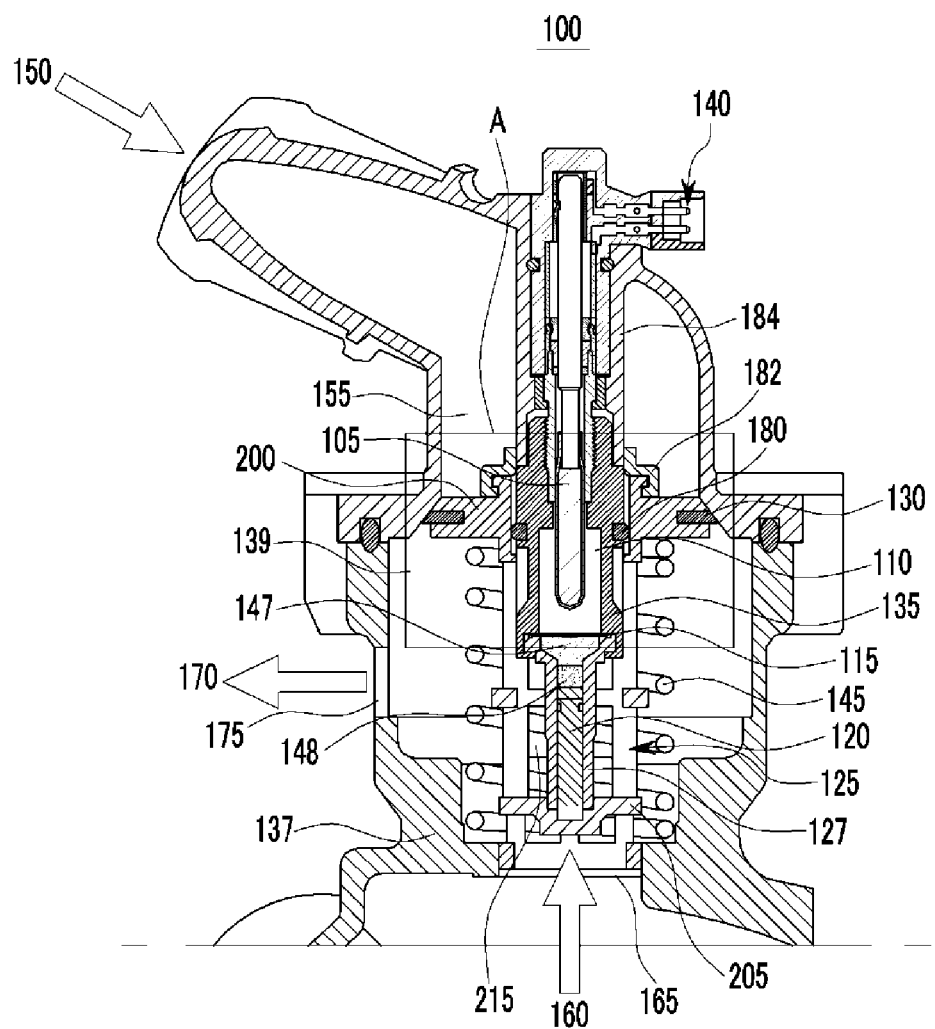
FIG. 1 is a partial cross-sectional view of a thermostat that is provided on an engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a partial cross-sectional view of a thermostat that is provided on an engine according to an exemplary embodiment of the present invention.

Referring to FIG. 1, an engine includes a radiator 150, a coolant outlet 160 of an engine, a coolant inlet 170 of an engine, and a thermostat 100.

The thermostat 100 includes a thermostat case 137, and a first passage 155 is formed to be connected to the radiator 150, a second passage 165 is formed to be connected to the coolant outlet 160, and a third passage 175 is connected to the coolant inlet 170 in the thermostat case 137.

A coolant pump in an exemplary embodiment of the present invention is disposed between the third passage 175 and the coolant inlet 170 to circulate coolant from the thermostat 100 to the engine.

As shown in drawings, the first passage 155 is formed at an upper side, the second passage 165 is formed at a lower side, and the third passage 175 is formed between the first and second passage 155 and 165.

A joining space 139 is formed in the thermostat case 137 to be connected to the first passage 155, the second passage 165, and the third passage 175, and the valve body 125 is disposed in the joining space 139.

A first valve 200 is integrally formed at an upper end portion of the valve body 125 to selectively close the first passage 155, and a second valve 205 is integrally formed at a lower end portion of the valve body 125 to selectively close the second passage 165. Further, a valve O-ring 130 is mounted along an exterior circumference of the first valve 200 to contact the interior circumference of the first passage 155.

A main spring 145 is disposed inside the thermostat case 137, and an upper end portion of the main spring 145 is elastically supports the lower end portion of the first valve 200 in an upper direction and a lower end portion of the main spring 145 is supported by an inner side of the thermostat case 137.

The main spring 145 has a coil spring structure and the valve body is inserted into the coil of the main spring 145 except the first valve 200 and the part that that is inserted into the second passage 165.

Further, a mounting space is formed along a central portion of the valve body 125 from an upper end side to a lower end side, and a drive portion that moves the valve body 125 is inserted into the mounting space 215.

The drive portion includes a mounting pipe 184, a piston support portion 225, a main piston 120, a rubber piston 148, a piston guide 127, a semi fluid 147, a diaphragm 115, a wax 110, a wax case 135, and a glow plug 105, wherein the glow plug 105 is electrically connected to a connector 140.

The piston support portion 225 is formed at a central portion of the second valve 205 that is formed at a lower end portion of the valve body 125.

As shown in the drawings, the wax case 135 is fixed on the mounting pipe 184 through a screw structure, and a sealing member 180 is interposed between the wax case 135 and the first valve 200.

The sealing member 180 forms a sealing structure between the wax case 135 and the first valve 200 and simultaneously is disposed such that the wax case 135 is moved upward or downward based on the wax case 135.

Figure 2:
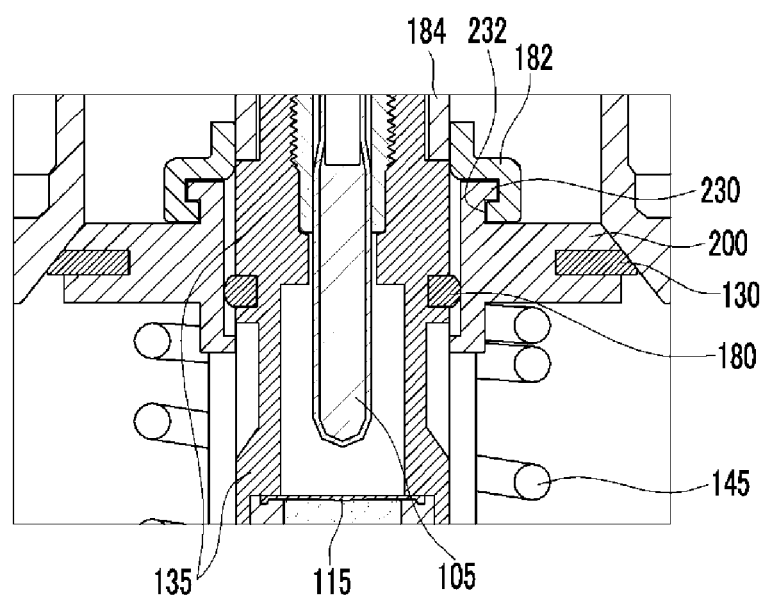
FIG. 2 is an expanded cross-sectional view showing part A of FIG. 1.

Further, a rubber cap 182 is disposed between the first valve 200 and the sealing member 180 such that the foreign material cannot invade therein. Referring to FIG. 2, the structure of the rubber cap 182 will be detailed.

FIG. 2 is an expanded cross-sectional view showing part A of FIG. 1.

Referring to FIG. 2, the wax case 135 is inserted into a central hole of the first valve 200, the sealing member 180 is interposed between the interior circumference of the hole of the first valve 200 and the exterior circumference of the wax case 135. Here, the sealing member 180 is mounted on the groove of the wax case 135 and slides with the first valve 200.

The rubber cap 182 is disposed on the exterior circumference of the wax case 135 to prevent the foreign material from being spreaded into the gap between the first valve 200 and the wax case 135.

More particularly, a mounting protrusion 230 is formed around the wax case 135 on the first valve 200, and a cap groove 400 is formed on the exterior circumference of the mounting protrusion 230.

A lower end portion interior circumference of the rubber cap 182 is inserted into the cap groove 400 to be fixed on the first valve 200, and an upper end portion interior circumference of the rubber cap 182 contacts the exterior circumference of the mounting pipe 184. Here, the rubber cap 182 slides on the mounting pipe 184 or the wax case 135 depending on the up/down position of the first valve 200.

As described above, the sealing member 180 is fixed on the wax case 135 to slide on the first valve 200, and the rubber cap 182 is fixed on the first valve 200 to slide on the mounting pipe 184 or the wax case 135.

Figure 3:
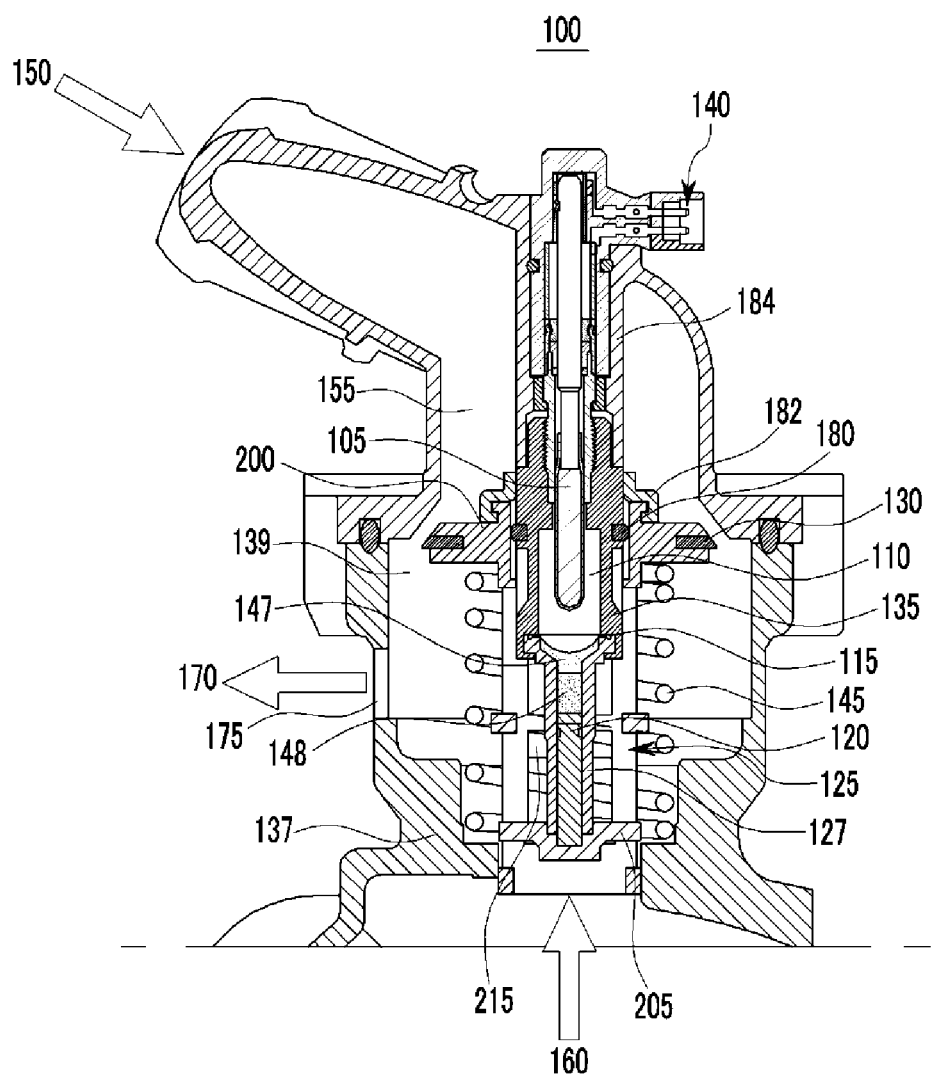
FIG. 3 is a partial cross-sectional view showing a condition that a thermostat is operated in an engine according to an exemplary embodiment of the present invention.

FIG. 3 is a partial cross-sectional view showing a condition that a thermostat is operated in an engine according to an exemplary embodiment of the present invention.

Referring to FIG. 3, the coolant that is supplied through the coolant outlet 160 joins the joining space 139 and then is supplied to the coolant inlet 170. And, when the temperature of the coolant is increased or the current is supplied to the glow pug, the temperature of the wax 110 is increased.

While the temperature of the wax is increased, the wax 110 is expanded to expand the diaphragm 115 in a lower direction.

If the diaphragm 115 is expanded in a lower direction, the rubber piston 148 and the main piston 120 is moved thereby downward and the main piston 120 pushes the piston support portion 225 of the valve body 125 in a lower direction.

If the piston support portion 225, the valve body 125, and the first valve 200 are moved downward, the first valve 200 opens the first passage 155 and the second valve 205 closes the second passage 165 or reduces the opening rate of the second passage 165.

The mounting pipe 184 and the wax case 135 are fixed with each other, if the first valve 200 and the valve body 125 move downward, the sealing member 180 slides with the first valve 200, and the rubber cap 182 slides with the mounting pipe 184 or the wax case 135 in an exemplary embodiment of the present invention.

Further, the rubber cap 182 prevents the foreign material from being flown into the gap between the first valve 200 and the wax case 135 and improves overall durability.

Figure 4:
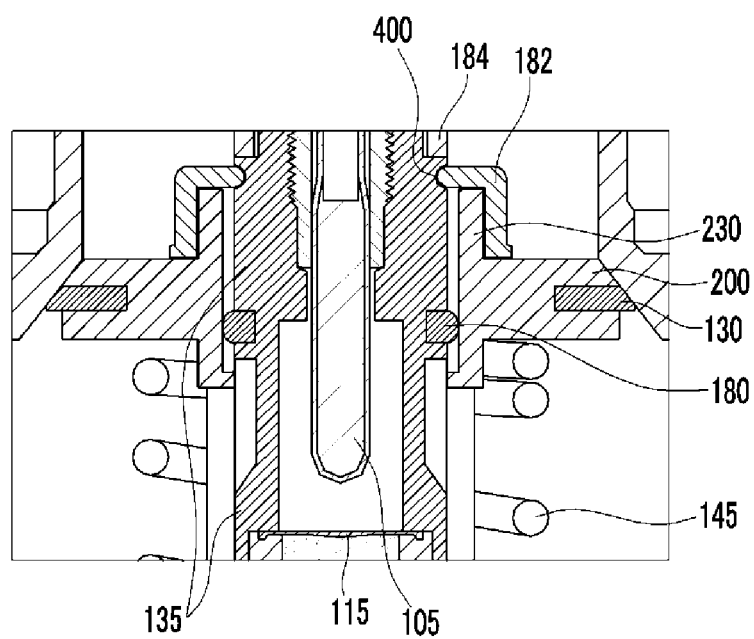
FIG. 4 is a partial expanded cross-sectional view of a thermostat of an engine according to another exemplary embodiment of the present invention.

FIG. 4 is a partial expanded cross-sectional view of a thermostat of an engine according to another exemplary embodiment of the present invention.

Referring to FIG. 4, the wax case 135 is inserted into the hole of the central portion of the first valve 200, and the sealing member 180 is interposed between the interior circumference of the hole of the first valve 200 and the exterior circumference of the wax case 135.

A mounting protrusion 230 is formed on the first valve 200 near the wax case 135 and a cap groove 400 is formed on the exterior circumference of the wax case 135 near the mounting protrusion 230.

The lower end portion interior circumference of the rubber cap 182 closely contacts the exterior circumference of the mounting protrusion 230 of the mounting protrusion 230, and the upper end portion of the rubber cap 182 is inserted into the cap groove 400. Here, the lower end portion interior circumference of the rubber cap 182 slides on the exterior circumference of the mounting protrusion 230 depending on the up/down movement of the first valve 200.

As described above, the rubber cap 182 is fixed on the wax case 135 and contacts the mounting protrusion 230 to slides thereon.

Figure 5:
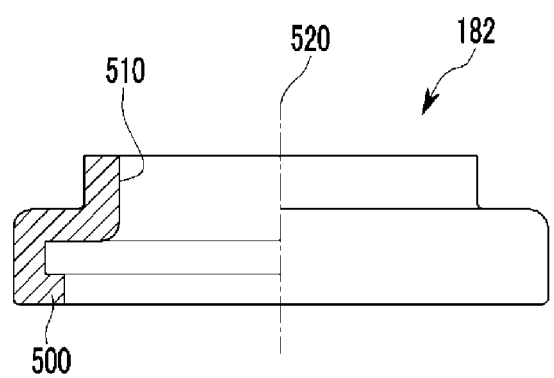
FIG. 5 is a cross sectional side view of a rubber cap that is disposed in a thermostat according to an exemplary embodiment of the present invention.

FIG. 5 is a cross sectional side view of a rubber cap that is disposed in a thermostat according to an exemplary embodiment of the present invention.

Referring to FIG. 5, the rubber cap 182 is formed as a cylindrical shape based on a central axis, and a hook protrusion 500 is formed on the interior circumference of the lower end portion of the rubber cap 182 in a circumference direction thereof. Further, a contact surface 510 is formed on the upper end portion interior circumference of the rubber cap 182.

The hook protrusion 500 is inserted into the cap groove 400 of the mounting protrusion 230 to fix the rubber cap 182 on the first valve 200, and the contact surface 510 contacts the mounting pipe 184 or the wax case 135 to slide thereon.

Figure 6:
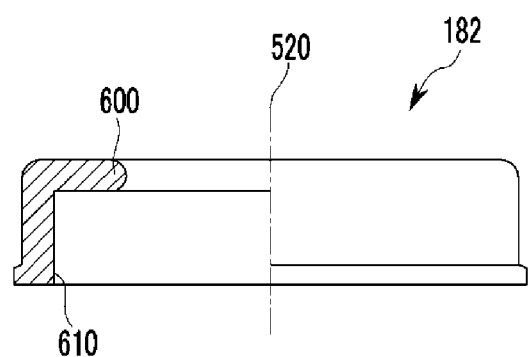
FIG. 6 is a cross sectional side view that is disposed in a thermostat according to another exemplary embodiment of the present invention.

FIG. 6 is a cross sectional side view that is disposed in a thermostat according to another exemplary embodiment of the present invention.

Referring to FIG. 6, the rubber cap 182 is formed as a cylindrical shape based on the central axis 520, and a contact surface 610 is formed on the lower end portion interior circumference thereof in a circumference direction. Further, a hook protrusion 600 is formed on the upper end portion interior circumference of the rubber cap 182.

The hook protrusion 600 is inserted into the cap groove 400 of the wax case 135 to fix the rubber cap 182 on the wax case 135, and the contact surface 610 contacts the exterior circumference of the mounting protrusion 230 to slide thereon.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermostat apparatus, comprising:
a thermostat case where a first passage is formed;
a first valve that is disposed in the thermostat case to open or close the first passage, wherein a mounting protrusion is formed along an inner circumference of the first valve;
a drive portion that is disposed to penetrate the first valve and moves the first valve depending on temperature to open or close the first passage,
wherein the drive portion includes:
   a mounting pipe that is fixed on a central portion of the first passage;
   a wax case that is fixed on one end of the mounting pipe and in which wax is charged to be contracted or expanded depending on the temperature; and
   a piston that moves a valve body that is integrally formed with the first valve by contraction or expansion of the wax to operate the first valve, wherein the rubber cap slides with an exterior circumference of the mounting pipe or the wax case depending on an operating position of the first valve; and a rubber cap that a first side interior circumference thereof contacts an exterior circumference of the mounting protrusion of the first valve and a second side interior circumference thereof contacts an exterior circumference of the drive portion.

2. The thermostat apparatus of claim 1, wherein the first side interior circumference of the rubber cap is fixed on the exterior circumference of the mounting protrusion and the second side interior circumference of the rubber cap slidably contacts the exterior circumference of the drive portion.

3. The thermostat apparatus of claim 2,
wherein a cap groove is formed on the exterior circumference of the mounting protrusion and a hook protrusion that is formed on the first side interior circumference of the rubber cap is inserted into the cap groove, and
wherein a contact surface is formed on the second side interior circumference of the rubber cap to slide on the exterior circumference of the drive portion.

4. The thermostat apparatus of claim 1,
wherein the first side interior circumference of the rubber cap slidably contacts the exterior circumference of the mounting protrusion, and
wherein the second side interior circumference of the rubber cap is fixed on the exterior circumference of the drive portion.

5. The thermostat apparatus of claim 4,
wherein a cap groove is formed on the exterior circumference of the drive portion,
wherein a hook protrusion that is formed on an interior circumference of the rubber cap is inserted into the cap groove, and
wherein a contact surface is formed on the first side interior circumference of the rubber cap to slide with the exterior circumference of the mounting protrusion.

6. The thermostat apparatus of claim 5, wherein the drive portion includes a wax case in which wax is charged to be contracted or expanded depending on the temperature.

7. The thermostat apparatus of claim 1, wherein a sealing member is interposed between the first valve and the drive portion.

8. The thermostat apparatus of claim 1, wherein the first valve is formed at a first side of the valve body, the second valve is formed at a second side thereof to open or close the second passage that is formed at the thermostat case,
wherein when the first valve closes the first passage, the second valve opens the second passage, and when the first valve opens the first passage, the second valve reduces an opening rate of the second passage or closes the second passage.

* * * * *